G. A. SCHIEREN.
LEACHING TANK.
APPLICATION FILED NOV. 12, 1913.
1,197,067.
Patented Sept. 5, 1916.
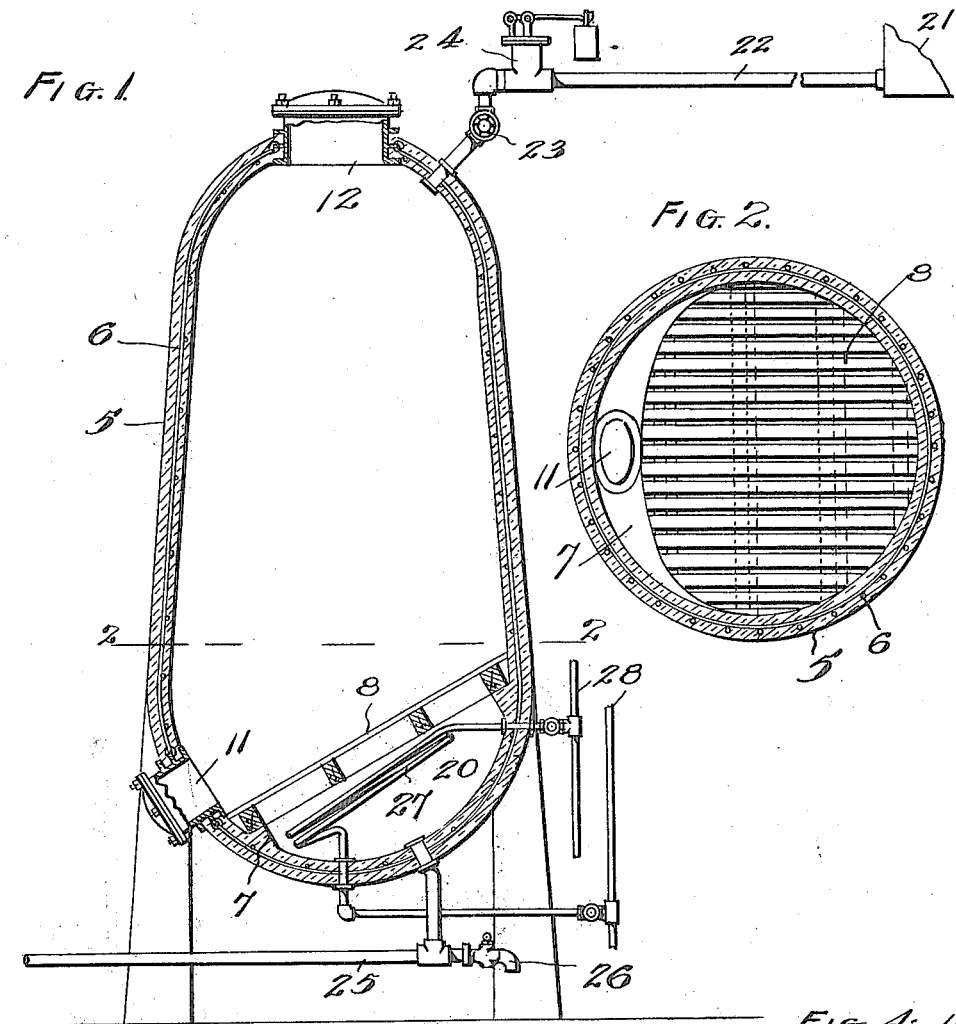

UNITED STATES PATENT OFFICE.

GEORGE ARTHUR SCHIEREN, OF BRISTOL, TENNESSEE.

LEACHING-TANK.

1,197,067.   Specification of Letters Patent.   Patented Sept. 5, 1916.

Application filed November 12, 1913.   Serial No. 800,462.

*To all whom it may concern:*

Be it known that I, GEORGE ARTHUR SCHIEREN, a citizen of the United States, residing at Bristol, Tennessee, have invented certain new and useful Improvements in Leaching-Tanks, of which the following is a specification.

My invention relates to a tank especially adapted for leaching tan bark or chips to produce tanning liquor by pressure. For this purpose, the leaching tank, I have discovered, may advantageously be made of reinforced concrete. The tank is made of increasing diameter from top to bottom to prevent jamming of the chips as they settle. Near the bottom of the tank is placed a screen or grid upon which the chips rest. Leaching fluid is supplied under pressure at the top of the tank and passes through the chips and grid into a space at the bottom of the tank, from which it is drawn off for storage or use. The grid is arranged at an angle, preferably slightly greater than the angle of repose of the chips, so that they will fall by gravity toward a cleaning opening or "pitch hole". The filling opening at the top of the tank is constructed and arranged so that it may principally consist of cheap material, such as iron, while it is protected from the influence of the leaching fluid by copper sheathing in an economical way. The pitch hole may also be similarly constructed. The apparatus also includes a suitable tank or tanks for the leaching fluid, suitable heating means, and suitable valves and piping for handling the fluid, as will be described.

The accompanying drawing shows an exemplifying structure embodying the invention, but it is to be understood that the details of construction and arrangement may be greatly varied within the invention.

Figure 1 is a vertical section through one of the leach tanks, showing also a fragment of a storage tank and suitable piping and valves, and suitable heating means. Fig. 2 is a horizontal section on the line 2—2 of Fig. 1. Fig. 3 is a section of the filling opening and cover, and Fig. 4 is a detail of the grid or false bottom construction.

Reference character 5 designates the leach tank, which preferably has a rounded top and bottom. Preferably, also, the side walls of the tank diverge toward the bottom, as shown, so that chips will not jam in the tank but will settle by gravity toward the bottom. The tank is preferably made of concrete, having suitable reinforcements 6, the particular form of reinforcement being variable to a great extent. Near the bottom, the tank is provided with an angular ledge 7, upon which rests a screen or grid 8 to support the chips. The details of construction of this screen may vary greatly, but it may comprise a main frame 9 upon which rest strips 10 forming the face or floor of the grid, and these are placed close enough to prevent passage of the chips but to permit passage of the liquor. Preferably, the parts of the grid are easily detachable, so that they may be removed through the pitch hole if desired. The angle of the grid is to be made slightly greater than the angle of repose so that the chips will tumble by gravity toward the pitch hole 11. At the top of the tank is filling hole 12. This is provided with a cylindrical liner or ring 13 (see Fig. 3), which may be of iron. The ring is provided with a plurality of flanges 14, the center one of which may be used conveniently for engagement by vertical members of the reinforcement 6, as shown. These flanges provide a secure and satisfactory union with the concrete body of the tank. A cover ring 15, which may also be of iron, is secured to the cylindrical ring 13 by means of slots 16 and swing bolts 17, or in any other convenient way. To prevent injurious action by the leaching fluid, rings 13 and 15 are provided with copper linings 18, which may be of thin sheet material. By this method of construction the cost of the metal work about the tank is very much reduced. The construction of the liner and cover for the pitch hole 11 may be substantially similar to the filling hole, as above described. Below the grid 8 is a space 20 to receive the tanning liquor passing through the grid. The leaching fluid is carried in a storage tank 21, placed sufficiently high to supply fluid to the leach tank under gravity pressure. A pipe 22 leads to the leaching tank (it being understood that one or more of the leaching tanks may be used, as desired), and the pipe is supplied with a suitable valve 23, and a safety valve 24 may also be provided to relieve excessive pressure. The tanning fluid is drawn from space 20 by pipe 25 and a drain valve 26 may also be provided. In space 20 may be placed a heating coil 27 with suitable connections 28.

I claim:

A leach tank of concrete having vertical and horizontal reinforcements enabling it to withstand internal pressure, a filling hole at the top and a pitch hole near the bottom, a ledge formed within the tank near the bottom and a chip screen lying thereon at an angle slightly greater than the angle of repose of the chips, metal rings and covers for said filling and pitch holes, said metal parts being provided with copper lining to withstand the action of leach liquor.

GEORGE ARTHUR SCHIEREN.

Witnesses:
D. H. BOOHER,
D. Y. McCRARY.

Copies of this patent may be obtained for five cents each, by addressing the "Commissioner of Patents, Washington, D. C."